United States Patent [19]

Sato

[11] Patent Number: 4,985,764
[45] Date of Patent: Jan. 15, 1991

[54] APPARATUS FOR DETECTING A PIXEL CORRELATION AND GENERATING AN INTERPOLATION SIGNAL FOR A DIGITAL TELEVISION SIGNAL

[75] Inventor: Koichi Sato, Yokohama, Japan
[73] Assignee: Kabushiki Kaisha Toshiba, Kawasaki, Japan
[21] Appl. No.: 391,294
[22] Filed: Aug. 8, 1989
[30] Foreign Application Priority Data Sep. 29, 1988 [JP] Japan ................... 63-244841

[51] Int. Cl.⁵ ............................................. H04N 5/14
[52] U.S. Cl. .................................. 358/105; 358/140; 358/166
[58] Field of Search ............... 358/140, 160, 105, 166, 358/167, 135, 138

[56] References Cited
U.S. PATENT DOCUMENTS 4,698,675 10/1987 Casey .
4,789,893 12/1988 Weston ........................ 358/166 X
4,845,560 7/1989 Kondo et al. ................. 358/105 X
4,862,267 8/1989 Gillard et al. ................. 358/105 X

FOREIGN PATENT DOCUMENTS 53-79421 7/1978 Japan .
55-150687 11/1980 Japan .

OTHER PUBLICATIONS

NEC Technical Journal, vol. 37, No. 4, "The Enhanced Definition Digital Television by Non-Interlace Scanning", K. Iwaibana, et al; 1987.

Primary Examiner—Victor R. Kostak
Attorney, Agent, or Firm—Oblon, Spivak, McClelland, Maier & Neustadt

[57] ABSTRACT

In this invention, a correlation data and interpolation data generation circuit generates a vertical correlation signal, a plurality of left-downwardly inclined direction correlation signals, and a plurality of right-downwardly inclined direction correlation signals. The vertical direction correlation signal is generated by deriving a difference between two pixels which lie on a vertical line passing the position (center) of a pixel to be interpolated. The left-downwardly inclined direction correlation signals are generated by deriving a difference between one pair of pixels among pixels present in four regions defined by the vertical line and a horizontal line crossing at the center, which pair of pixels are arranged symmetrically in relation to the center and which respectively lie in the upper right region and lower left region, and the right-downwardly inclined direction correlation signals generated by deriving a difference between one pair of pixels which pair of pixels are arranged symmetrically in relation to the center and which respectively lie in the upper left region and lower right region. A correlation detection section receives the vertical direction correlation information, the left-downwardly inclined direction correlation signals, and the right-downwardly inclined direction correlation signals, and detects the smallest one of the absolute values of those signals and outputs data indicating the direction of pixels providing the smallest absolute value as a correlation detecting signal.

6 Claims, 15 Drawing Sheets

FIG. 4

| PICTURE ELEMENTS IN THE CURRENT CYCLE \ PICTURE ELEMENTS IN THE PRECEDING CYCLE | (A1, B5) | (A2, B4) | (A3, B3) | (A3, B3) ☆ | (A3, B3) ☆ | (A3, B3) ☆ | S7 |  |  |
|---|---|---|---|---|---|---|---|---|---|
| (A1, B5) | (A1, B5) | (A2, B4) | (A3, B3) | (A3, B3) ☆ | (A3, B3) ☆ | (A3, B3) ☆ | (A4, B2) | (A5, B1) | (A6, B0) |
| (A2, B4) | (A1, B5) | (A2, B4) | (A3, B3) | (A3, B3) ☆ | (A3, B3) ☆ | (A3, B3) ☆ | (A3, B3) | (A3, B3) | (A3, B3) |
| (A3, B3) | (A2, B4) | (A2, B4) | (A2, B4) | (A3, B3) ☆ | (A3, B3) ☆ | (A3, B3) ☆ | (A3, B3) | (A3, B3) | (A3, B3) |
| (A4, B2) | (A3, B3) | (A3, B3) | (A3, B3) | (A3, B3) | (A3, B3) | (A3, B3) | (A3, B3) | (A3, B3) | (A3, B3) |
| (A5, B1) | (A4, B2) | (A4, B2) | (A4, B2) | (A4, B2) | (A4, B2) | (A4, B2) | (A4, B2) | (A4, B2) | (A4, B2) |
| (A6, B0) | (A5, B1) | (A5, B1) | (A5, B1) | (A5, B1) | (A5, B1) | (A5, B1) | (A5, B1) | (A5, B1) | (A5, B1) |
|  | (A6, B0) | (A6, B0) | (A6, B0) | (A6, B0) | (A6, B0) | (A6, B0) | (A6, B0) | (A6, B0) | (A6, B0) |

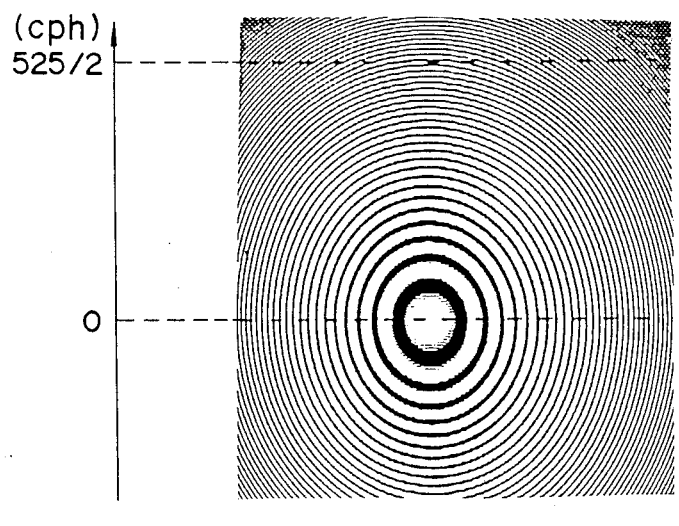
FIG. 5A ORIGINAL
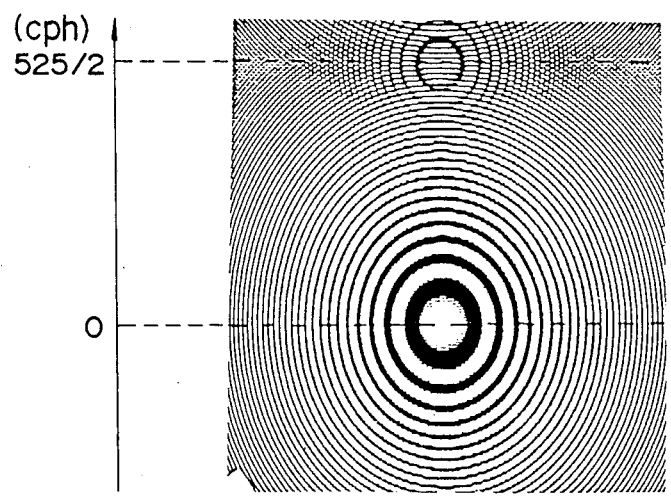
FIG. 5B DOUBLE-SCANNING METHOD

UPPER-LOWER SIGNAL ADDITION METHOD

UPPER-LOWER SIGNAL ADDITION METHOD
----
CORRELATION DETERMINATION

CORRELATION DETERMINATION AND UPPER-LOWER SIGNAL ADDITION

| | | | | | | | | | |
|---|---|---|---|---|---|---|---|---|---|
| Δ1 | X | X | X | X | X | X | X | + | − |
| Δ2 | X | X | X | X | X | X | − | + | + |
| Δ3 | + | + | − | X | X | X | − | − | − |
| Δ4 | X | + | − | − | − | − | + | + | + |
| Δ5 | + | − | + | − | − | − | X | X | X |
| Δ6 | X | X | X | − | + | + | X | X | X |
| Δ7 | X | X | X | X | − | + | X | X | X |
| | C4 | | | C5 | C6 | C7 | C3 | C2 | C1 |

FIG. 9

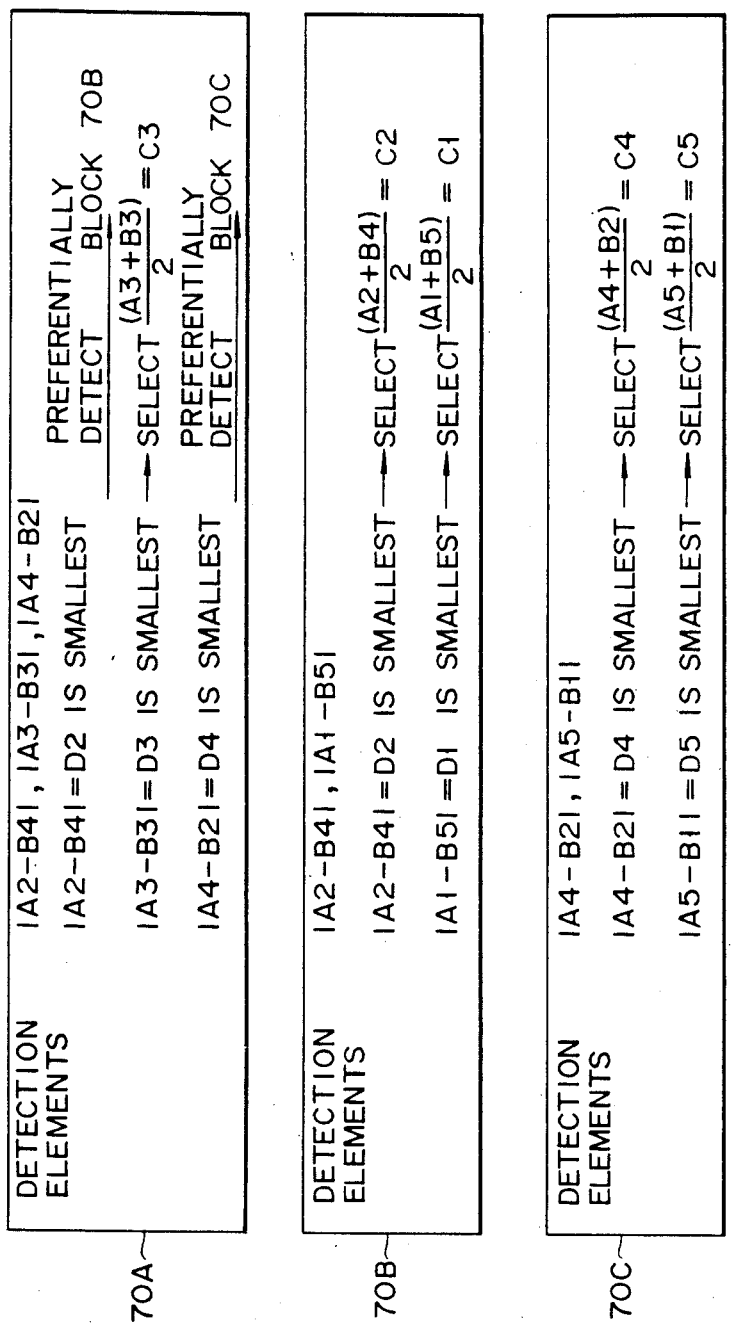
F I G. 13

APPARATUS FOR DETECTING A PIXEL CORRELATION AND GENERATING AN INTERPOLATION SIGNAL FOR A DIGITAL TELEVISION SIGNAL

BACKGROUND OF THE INVENTION

1. Field of the Invention

This invention relates to an apparatus for detecting a pixel correlation and generating an interpolation signal for a digital television signal contained in a television signal processing device used, for example, in a high quality digital television system.

2. Description of the Related Art

In a sequential scanning conversion circuit for converting an interlace television signal into a non-interlace television signal, for example, a scanning line interpolating process is effected. This process can be accomplished using either double-scanning type interpolation or upper-lower signal addition type interpolation.

In the case of double-scanning, an interlace signal is supplied to a delay circuit having a delay time corresponding to one horizontal scanning period. The output signal of the delay circuit is used as an interpolation signal which is combined with the input interlace signal by means of a synthesizing circuit which in turn supplies a non-interlace signal to a processing circuit.

In the case of upper-lower signal addition, an input interlace signal is supplied to a first delay circuit and a first constant multiplier having a coefficient of $\frac{1}{4}$. An output signal of the first delay circuit is supplied to a second delay circuit and a second constant multiplier having a coefficient of 1; the first and second delay circuit each have a delay time corresponding to one horizontal scanning period. An output signal of the second delay circuit is supplied to a third constant multiplier having a coefficient of $\frac{1}{4}$. Output signals of the first, second, and third constant multipliers are added together in an adder. As a result, the adder obtains an interpolation signal which is combined with an input interlace signal in an synthesizing circuit, which in turn supplies a non-interlace signal to a processing circuit.

The double-scanning type interpolation signal generating circuit and the upper-lower signal addition type differ in the vertical filtering characteristic of the derived interpolation signal, with the cut-off frequency in the upper-lower signal addition type circuit being lower than in the double-scanning type circuit. Hence, when a vertical high-frequency component, which has a vertical spatial frequency of 525/2, is supplied to both types of circuits under the same conditions, the upper-lower signal addition type circuit attenuates the high-frequency component more than the double-scanning type one.

The high-frequency component will appear as an aliasing component in the image formed from the television signals and interpolation signals. Therefore, it would be desirable to use the upper-lower signal addition type interpolation signal generating circuit which attenuates the high-frequency component more than the double-scanning type. As described above, less aliasing components will appear in the upper-lower signal addition type method than in the double-scanning type method. On the other hand, the upper-lower signal addition type method has a problem in that vertical high frequency components are attenuated.

A high-quality image may be obtained from television signals and interpolation signals which are represented pixels, provided that each interpolation signal has been generated by interpolating two television signals which are represented very similar pixels. Nonetheless, it is desirable that a processing device be manufactured and used which is simple in structure and operates at high speed to detect the similarity between any two pixels.

Accordingly, the object of this invention is to provide an apparatus which is simple in structure and can operate at high speed to detect the similarity between pixels, and also an apparatus which is simple in structure and can generate interpolation signals, both apparatuses being capable of cooperating to form a high-quality image.

SUMMARY OF THE INVENTION

The above object can be attained by an apparatus for detecting a pixel correlation and generating an interpolation signal for a digital television signal comprising correlation data generation means having four regions imaged, which regions are the upper right region, the upper left region, the lower right region, and the lower left region, and are divided by a vertical line and a horizontal line which cross at the position of a pixel to be interpolated, said correlation data generation means having means for generating a vertical direction correlation signal (D4) generated by deriving a difference between two pixels which are present on the vertical line and which respectively lie on upper and lower sides of the position of the pixel to be interpolated, a plurality of left-downward angle correlation signals (D1, D2, D3) created for respective pairs of pixels lying symmetrically in the upper right and lower left regions, respectively, and a plurality of right-downward angle correlation signals (D5, D6, D7) created for respective pairs of pixels lying symmetrically in the upper left and lower right regions, respectively, and correlation detecting means including algorithm means for detecting the smallest one of the absolute values of the vertical correlation signal (D4), a first left-downward angle correlation signal (D3), and a first right-downward angle correlation signal (D5), which signals are derived from said plurality of left-downward angle correlation signals (D1, D2, D3) and said plurality of right-downward angle correlation signals (D5, D6, D7), by using pixels which are closest to the vertical line, detecting the smallest one of the absolute values of said vertical correlation signal (D4) and outputting data indicating the pixels (B3, A3) which are used to obtain the smallest value as the correlation detection signal (F1) when the vertical correlation signal (D4) is detected to have the smallest value, detecting the smallest one of said plurality of left-downward angle correlation signals (D1, D2, D3) and outputting data indicating the direction and angle of pixels (B4, A2) which are used to obtain the smallest value as the correlation detection signal (F1) when the first left-downward angle correlation signal (D3) is detected to have the smallest value, and detecting the smallest one of said plurality of right-downward angle correlation signals (D5, D6, D7) and outputting data indicating the direction and angle of pixels (B2, A4) which are used to obtain the smallest value as the correlation detection signal (F1) when the first right-downward angle correlation signal (D5) is detected to have the smallest value.

BRIEF DESCRIPTION OF THE DRAWINGS

FIG. 4 is a table for illustrating the detecting operation of a direction detecting section in the circuit of FIG. 1;

FIG. 5A is an illustration of oscilloscope waveforms obtained by simulating the original picture signal using a zone plate;

FIG. 5B is an illustration of oscilloscope waveforms obtained by simulating a video signal including an interpolation signal generated by the double-scanning method using a zone plate;

FIG. 9 is a truth table for illustrating the operation of correlation detecting section of FIG. 8;

FIG. 13 is a table for illustrating the algorithm for a correlation detecting section of another embodiment of this invention of FIG. 12.

DETAILED DESCRIPTION OF THE PREFERRED EMBODIMENTS

There will now be described an embodiment of this invention with reference to the accompanying drawings.

Figure 1A:
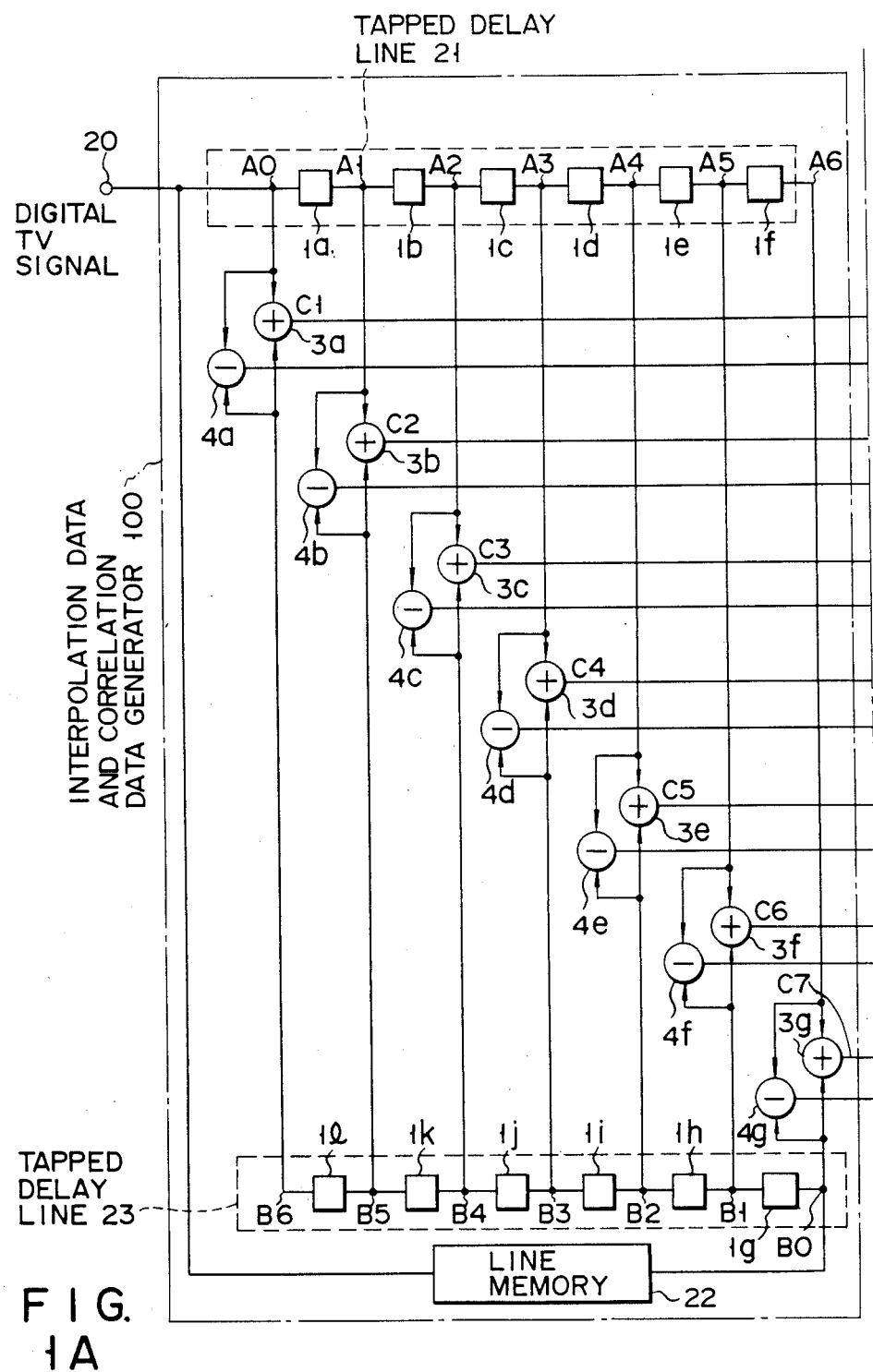
FIGS. 1A and 1B form a circuit diagram showing one embodiment of this invention.
Figure 1B:
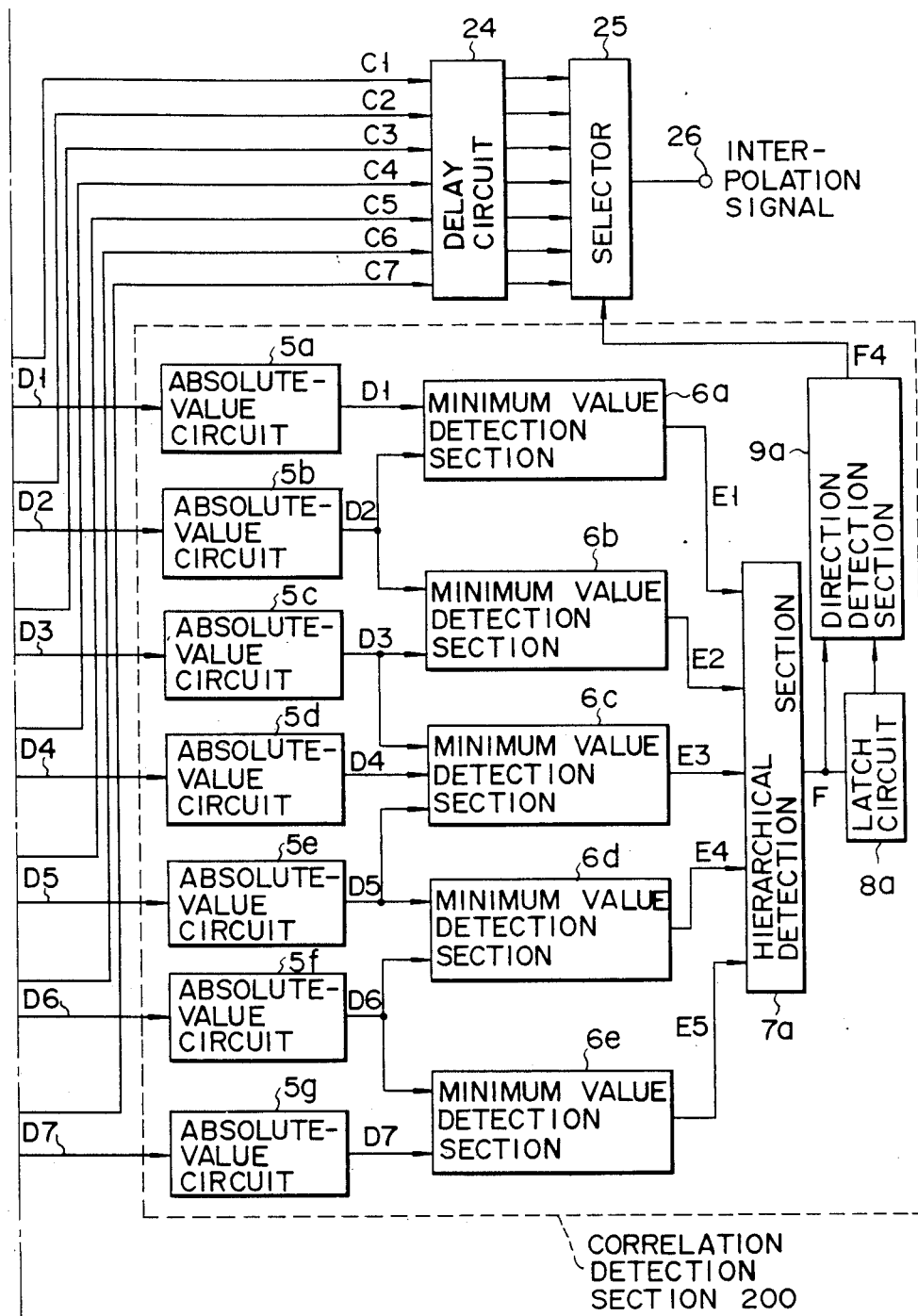

FIG. 1 shows an embodiment of this invention. In FIG. 1, television signal A1 at input terminal 20 is supplied to interpolation data and correlation data generation circuit 100. For example, interpolation data and correlation data generation circuit 100 can simultaneously generate a plurality of interpolation signals C1 to C7 by using data of scanning lines of an interlaced digital television signal, for example. Further, interpolation data and correlation data generation circuit 100 can simultaneously generate a plurality of interpolation signals D1 to D7 by using the scanning line data.

Interpolation data and correlation data generation circuit 100 can be formed in the form of line memory, field memory or the like.

In this embodiment, interpolation data and correlation data generation circuit 100 is constituted to include tapped delay lines 21 and 23, line memory 22, adders $3a$ to $3g$ and subtracters $4a$ to $4g$.

The digital television signal at input terminal 20 is supplied to first tapped delay line 21 and to second tapped delay line 23 via line memory 22 as input B0. Line memory 22 has a delay time corresponding to one horizontal scanning period. First and second tapped delay lines 21 and 23 are respectively include unit delay elements $1a$ to $1f$ and $1g$ to $1l$. Each of the pixels at the taps of first and second delay lines 21 and 23 are denoted by A0 to A6 and B0 to B6 as shown in FIG. 1. In this embodiment, pixels A0 and B6 are supplied to adder $3a$ and subtracter $4a$, pixels A1 and B5 are supplied to adder $3b$ and subtracter $4b$, pixels A2 and B4 are supplied to adder $3c$ and subtracter $4c$, pixels A3 and B3 are supplied to adder $3d$ and subtracter $4d$, pixels A4 and B2 are supplied to adder $3e$ and subtracter $4e$, pixels A5 and B1 are supplied to adder $3f$ and subtracter $4f$, and pixels A6 and B0 are supplied to adder $3g$ and subtracter $4g$.

The outputs of adders $3a$ to $3e$, that is, interpolation signals C1 to C7 are supplied to delay circuit 24 for phase adjustment, and then supplied to selector 25 which in turn selects one of interpolation signals C1 to C7 and supplies a selected interpolation signal to output terminal 26 as an interpolation signal.

The outputs of subtracters $4a$ to $4g$, that is, correlation signals (difference signal between pixels) D1 to D7 are supplied to absolute-value circuits $5a$ to $5g$ constituting correlation detection section 200 and output as an absolute difference output. In this embodiment, the difference absolute outputs of absolutevalue circuits $5a$ to $5g$ are treated as correlation signals D1 to D7.

Absolute difference outputs D1 and D2 are supplied to minimum value detection section $6a$, absolute difference outputs D2 and D3 are supplied to minimum value detection section $6b$, absolute difference outputs D3 and D4 are supplied to minimum value detection section $6c$, absolute difference outputs D5 and D6 are supplied to minimum value detection section $6d$, and absolute difference outputs D6 and D7 are supplied to minimum value detection section $6e$. In this case, each of minimum value detection sections $6a$ to $6e$ detects one of the smallest value among the respective inputs and supplies a corresponding one of detection outputs E1 to E5 to hierarchical detection section $7a$.

Hierarchical detection section $7a$ processes detection outputs E1 to E5 according to algorithm and outputs correlation detection signal F1.

Figure 2:
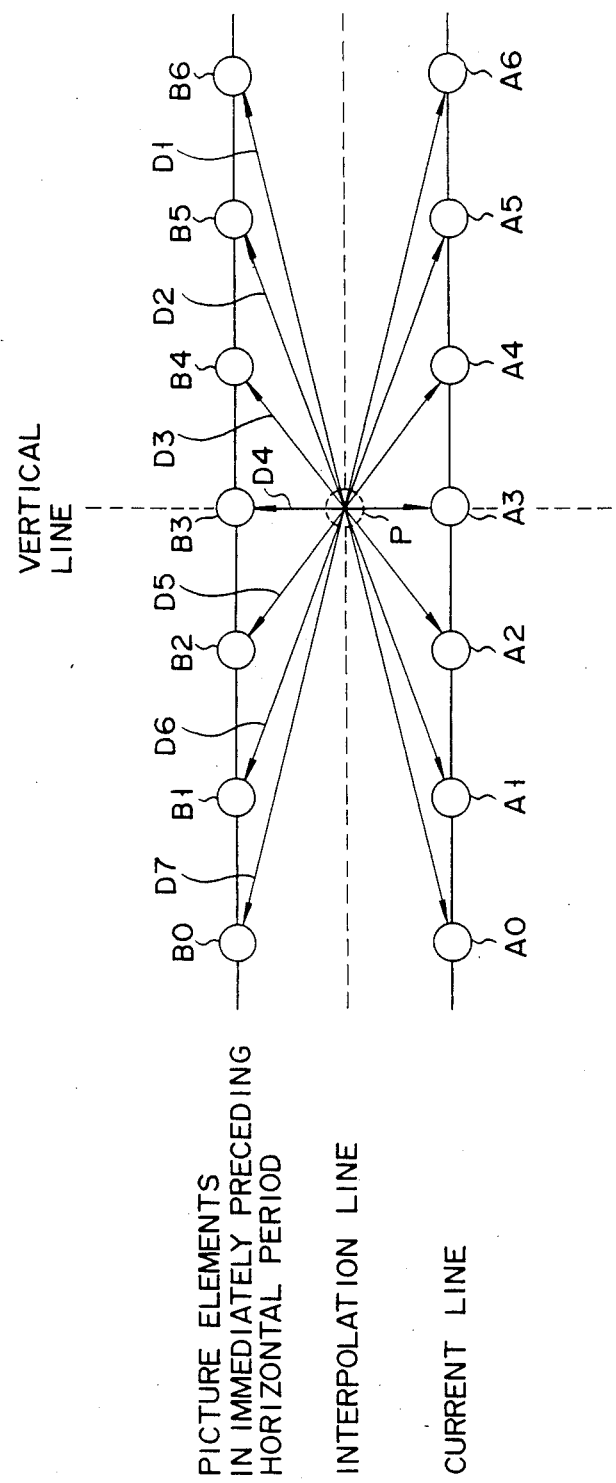
FIG. 2 is a diagram showing a pixel processing principle for illustration of the operation of the circuit shown in FIG. 1.

FIG. 2 shows the operational relation between pixels A0 to A6 and B6 to B0 and the positional relation of pixels for obtaining an interpolation signal and a correlation signal.

Interpolation signal and correlation data generation circuit 100 processes the pixels set in the positional relation shown in FIG. 2.

That is, a plurality of pixels on first and second lines which are vertically adjacent to each other are selected to face one another. The positions of pixels (A3 and B3 in FIG. 2) each lying at the center of the plurality of selected pixels of each line in the horizontal direction are defined as reference positions. The picture image space is divided into four regions, upper right region, lower right region, lower left region and upper left region by a vertical line passing the reference positions and a horizontal line (interpolation line) passing the position of interpolation data to be interpolated. In a case where interpolation signal P is set at the center, pairs of pixels such as paired signals (A0 and B6), (A1 and B5) and (A2 and B4) are present in the upper right region and lower left region, and the pixels of each pair are processed. Also, paired pixels such as paired signals (B0 and A6), (B1 and A5) and (B2 and A4) are present in the upper left region and lower right region.

Correlation signals D1 to D7 are derived as the difference processing results for respective pairs of pixels and interpolation signals C1 to C7 are obtained as the addition processing results. The pixels having the highest correlation are detected by using the correlation signals D1 to D7. Interpolation signal P is obtained by adding pixels having a high correlation.

In this specification, correlation signals D3, D2 and D1 are each referred to as a left-downward angle correlation signal and are generally referred to as left-downwardly inclined direction correlation information. Also, correlation signals D5, D6 and D7 are each referred to as a right-downward angle correlation signal and are generally referred to as right-downwardly inclined direction correlation information.

The inclined direction correlation information indicates whether a line connecting the pixels used for deriving the correlation extends in a left-downwardly inclined direction or right-downwardly inclined direction. Further, the angle correlation information indicates the inclined direction and the angle of a line connecting the pixels used for deriving the correlation. The correlation signal derived by using pixels on the vertical line is defined as a vertical correlation signal.

Further, interpolation signal C4 generated by using pixels on the vertical line is referred to as a reference interpolation signal, interpolation signals C1, C2 and C3 are each referred to as a left-downwardly inclined direction interpolation signal, and interpolation signals C5, C6 and C7 are each referred to as a right-downwardly inclined direction interpolation signal.

Figure 3:
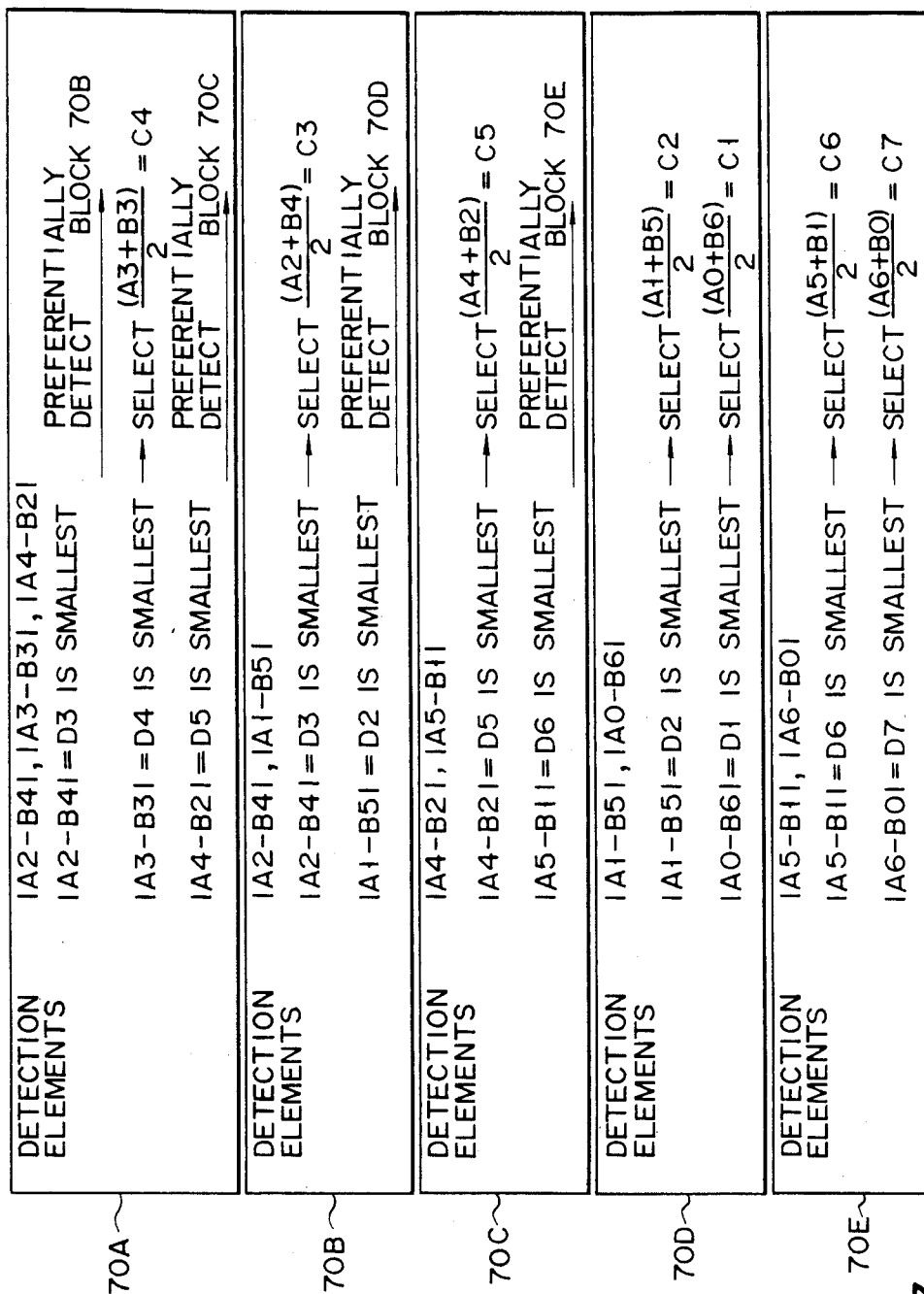
FIG. 3 is a table for illustrating the algorithm for a correlation detecting section in the circuit of FIG. 1.

FIG. 3 shows an example of a detection algorithm used in correlation detection section 200.

Hierarchical detection section 7a first effects the logic detection process for the contents shown in block 70A. That is, when the detection result of minimum value detection section 6c indicates that D3 is the smallest signal, the logic detection of block 70B is preferentially effected, and when the detection result indicates that D5 is the smallest signal, the logic detection of block 70C is preferentially effected. Further, when the detection result indicates that D4 is the smallest signal, correlation detection output F1 for specifying that signal C4 which is the output of adder 3d should be selected is output.

In the logic detection process of block 70B, when it is detected that D3 is the smallest signal among D3 and D2, correlation detection output F1 for specifying that signal C3 which is the output of adder 3c should be selected is output, and when it is detected that D1 is the smallest signal, the logic detection of block 70D is preferentially effected.

Further, in the logic detection process of block 70C, when it is detected that D5 is the smallest signal among D5 and D6, correlation detection output F1 for specifying that signal C5 which is the output of adder 3e should be selected is output, and when it is detected that D6 is the smallest signal, the logic detection of block 70E is preferentially effected. In the logic detection process of block 70D, when it is detected that D2 is the smallest signal among D2 and D1, correlation detection output F1 for specifying that signal C2 which is the output of adder 3b should be selected is output, and when it is detected that D1 is the smallest signal, correlation detected output F1 for specifying that signal C1 which is the output of adder 3a should be selected is output. In the logic detection process of block 70E, when it is detected that D6 is the smallest signal among D6 and D7, correlation detection output F1 for specifying that signal C6 which is the output of adder 3f should be selected is output, and when it is detected that D7 is the smallest signal correlation detection output F1 for specifying that signal C7 which is the output of adder 3g should be selected is output. Then, correlation detection output F1 is supplied to control selector 25.

The correlation detection output of hierarchical detection section 7a causes selector 25 to select an interpolation signal formed by pixels having highest correlation between vertically adjacent two lines. Therefore, it is possible to use output F1 of hierarchical detection section 7a as control signal F4 (shown in FIG. 1) as it is.

In this embodiment, the following means is provided in order to prevent the erroneous operation. That is, the output of hierarchical detection section 7a is supplied to latch circuit 8a and direction detecting section 9a. Direction detecting section 9a checks variation of the current correlation detection output with respect to the correlation detection output of the immediately preceding pixel. In other words, if the correlation (correlation of the right-downward direction) between pixels B2 and A4 has been kept at the highest value but the correlation of a direction relating to pixels B5 and A1 (left-downward direction) is detected to be the highest in the detection process at the next clock timing, there is a possibility that the detection operation is effected erroneously.

Therefore, in a case where the detection result indicates that the correlation between the pixels in a direction different from that detected in the detection process effected for the immediately preceding pixel, correlation detection output F4 for specifying that an intermediate signal {in this example, $(A3+B3)/2=C3$} should be selected is forcedly output.

FIG. 4 shows the detection algorithm in direction detection section 9a. The contents on the top line in the table of FIG. 4 show pairs of pixels having high correlations detected based on the result of correlation detection processes effected for deriving an interpolation signal in the preceding cycle (for the immediately preceding pixel). The left-most column in the table shows pairs of pixels having high correlations detected based on the result of correlation detection processes effected for deriving an interpolation signal in the current cycle (for the next pixel).

Now, a case is explained by taking portion S indicated by a star mark as an example. In this case, the correlation between A4 and B2 is detected to be the highest according to the result of correlation detection process effected in the preceding cycle for the immediately preceding pixel, but the correlation between A1 and B5 is detected to be the highest according to the result of correlation detection process effected in the preceding cycle. That is, as is clearly seen from FIG. 2, the direction of a line connecting paired pixels having the highest correlation in the current cycle becomes quite different from that in the preceding cycle. Since, in this case, the possibility that the correlation detection process has been erroneously effected is high, the content of a correlation detection signal is forcedly changed so as to specify that an interpolation signal obtained based on A3 and B3 should be selected.

Other portions indicted by star marks in FIG. 4 are processed in the same manner as described above.

Figure 5C:
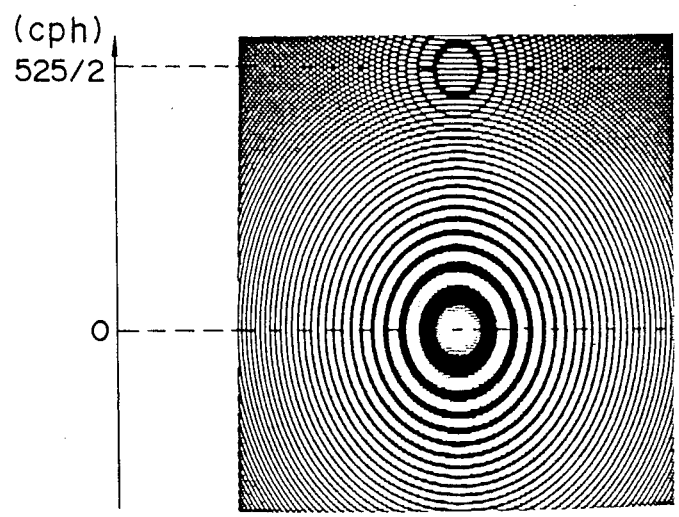
FIG. 5C is an illustration of oscilloscope waveforms obtained by simulating a video signal including an interpolation signal generated by the upper-lower signal addition method using a zone plate.
Figure 5D:
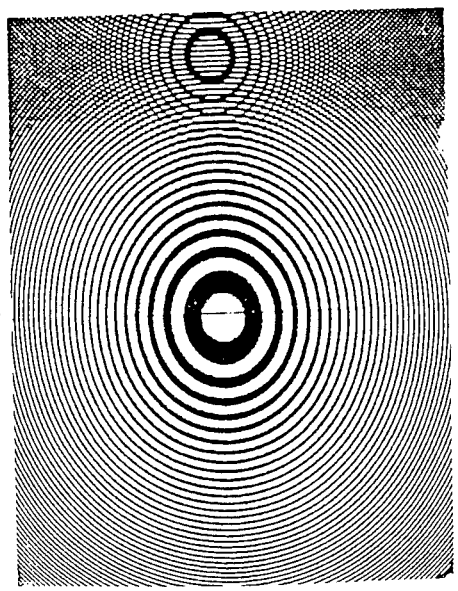
FIG. 5D is an illustration of oscilloscope waveforms obtained by simulating a video signal including an interpolation signal generated by a method of this invention using a zone plate.

FIG. 5 is a diagram showing the simulation by using a zone plate. More specifically, FIG. 5A shows the simulation for the original signal, FIG. 5B shows the simulation obtained by using the double-scanning type method, FIG. 5C shows the simulation by using the upper-lower signal addition type method and FIG. 5D shows the simulation of the embodiment of this invention. As is clearly seen from FIGS. 5A to 5D, the aliasing components in FIGS. 5B and 5C for the original picture of FIG. 5A clearly appear, but in the picture of FIG. 5D, the aliasing components are significantly reduced, and the high frequency characteristic of the vertical components is improved.

Figure 6:
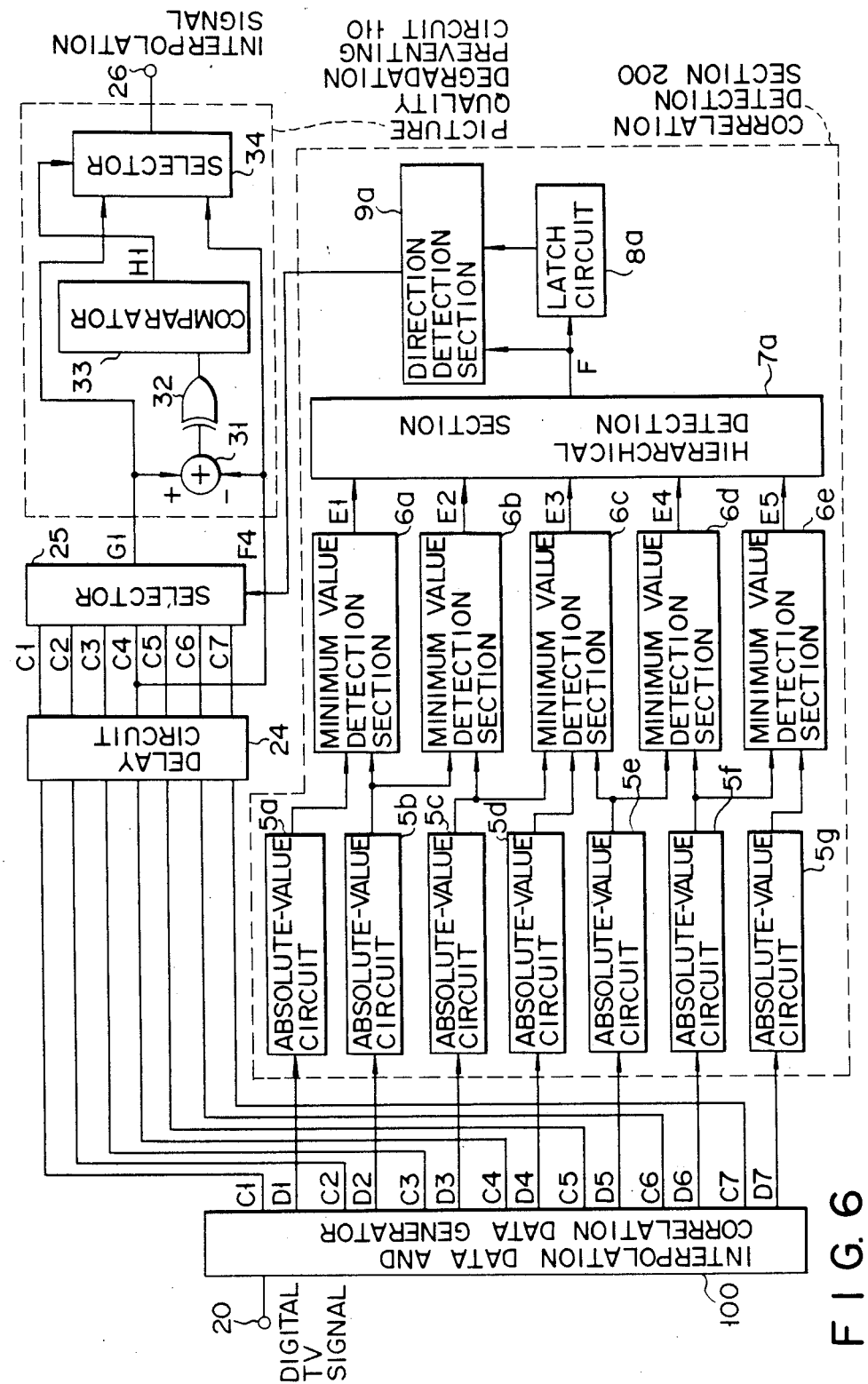
FIG. 6 is a circuit diagram showing another embodiment of this invention.

FIG. 6 shows another embodiment of this invention. Portions which are the same as those of the first embodiment are denoted by the same reference numerals as those used in FIG. 1.

In this embodiment, picture quality degradation preventing circuit 110 is additionally connected between selector 25 and output terminal 26. Picture quality degradation preventing circuit 110 includes a subtracter 31 for deriving a difference between signal G1 output from selector 25 and output signal C4 of delay circuit 24, absolute-value circuit 32 for obtaining an absolute value of an output of subtracter 31, and comparator 33 for comparing the output of absolute-value circuit 32 with a preset threshold value. Further, picture quality degradation preventing circuit 110 includes selector 34. Selector 34 is controlled by control signal H1 from comparator 33 to select one of output signal C4 of delay circuit 24 and output signal G1 of selector 25 and supplies the selected output signal to output terminal 26 as an interpolation signal. When the absolute value of a difference between signals G1 and C4 is larger than the threshold value, selector 34 forcedly selects and supplies standard interpolation signal C4, and when the absolute value of a difference between signals G1 and C4 is smaller than the threshold value, selector 34 selects and supplies signal G1.

Figure 7A:
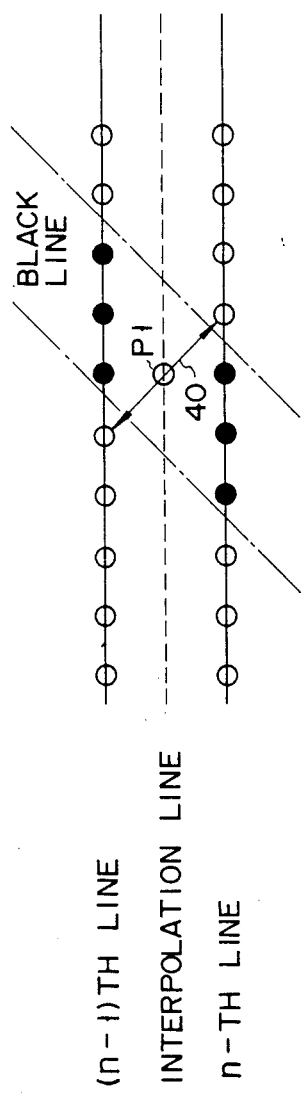
FIG. 7A is a diagram showing the arrangement of pixels shown for illustrating an example of the erroneous correlation detection.
Figure 7B:
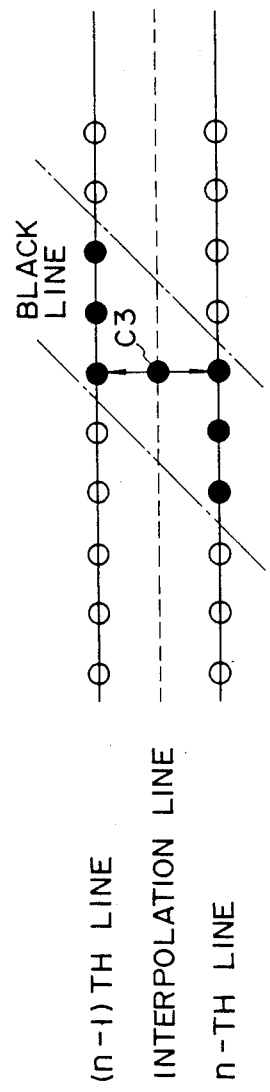
FIG. 7B is a diagram showing the arrangement of pixels shown for illustrating the function of a picture degradation preventing circuit of FIG. 6.
Figure 8:
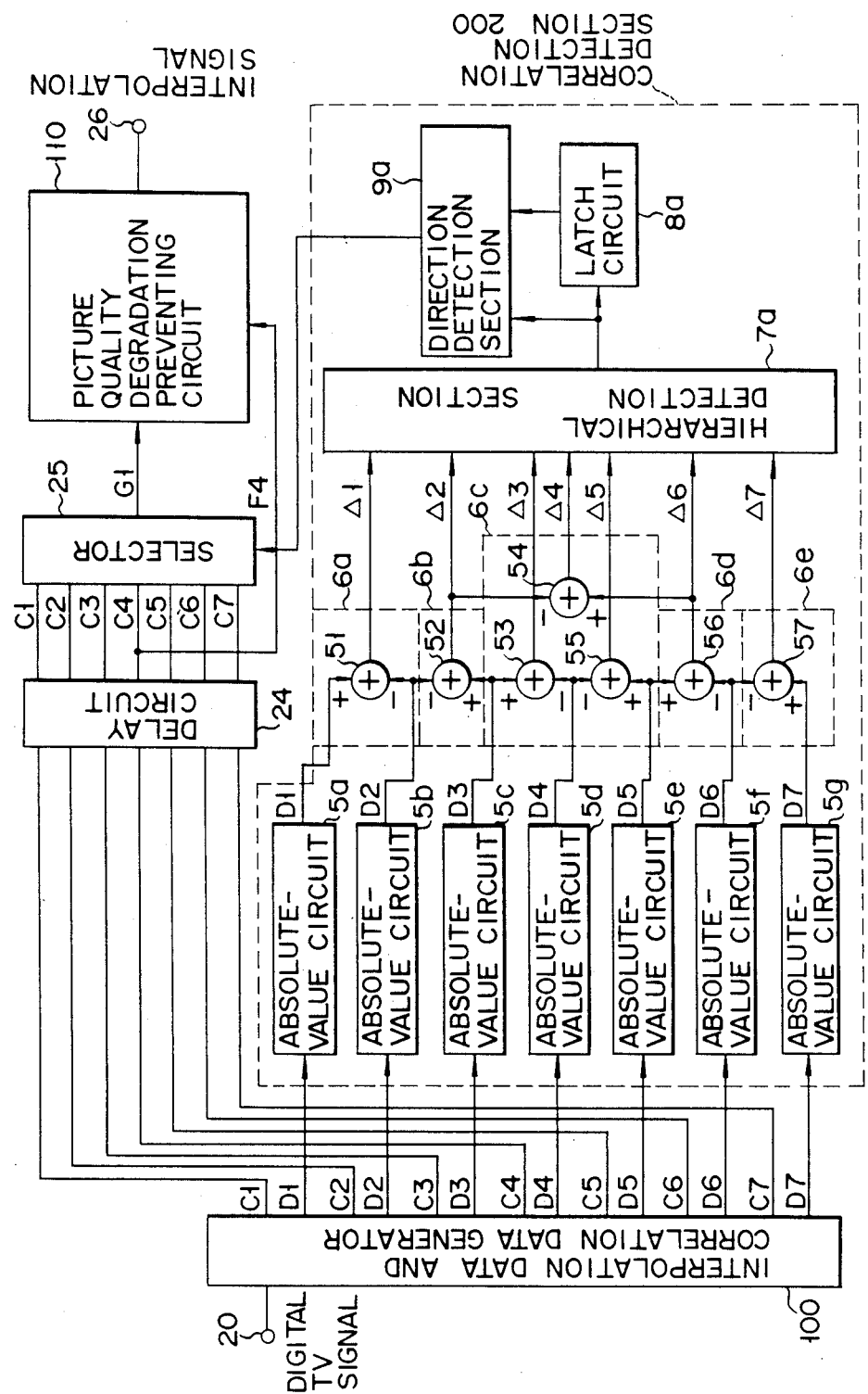
FIG. 8 is a circuit diagram showing still another embodiment of this invention.

The function of picture quality degradation preventing circuit 110 becomes effective when a detection error has occurred in correlation detection section 200. An interpolation signal which is included in interpolation signals caused by the erroneous detection and which appears noticeably on the display screen is close to an impulsive noise component. For example, assume that a black line is displayed on the display screen as shown in FIG. 7A and an erroneous detection in which a correlation in a direction indicated by arrow 40 is detected to be the highest is made when interpolation pixel P1 is generated. Then, a white dot may appear in the black line. Such an impulsive component will appear noticeably on the display screen. However, when picture quality degradation preventing circuit 110 of the above embodiment is used, the white dot signal will be larger than the threshold value so that selector 34 may select signal C4. That is, if the detection error has occurred, standard interpolation signal C4 is forcedly selected and supplied as a final interpolation signal. Then, as shown in FIG. 7B, the noticeable white dot will disappear from the black line on the display screen, thereby preventing the degradation in the picture quality. In FIGS. 7A and 7B, white and black circles indicate pixels. FIG. 8 shows still another embodiment of this invention. In this embodiment, minimum value detection section 6a, 6b, 6c, 6d and 6e of correlation detection section 200 are shown in more detail. That is, output signals D1 and D2 from absolute-value circuits 5a and 5b are supplied to subtracter 51, output signals D2 and D3 from absolute-value circuits 5b and 5c are supplied to subtracter 52, and output signals D3 and D4 from absolute-value circuits 5c and 5d are supplied to subtracter 53. Further, output signals D4 and D5 from absolute-value circuits 5d and 5e are supplied to subtracter 55, and output signals D5 and D6 from absolute-value circuits 5e and 5f are supplied to subtracter 56. Output signals D6 and D7 from absolute-value circuit 5f and 5g are supplied to subtracter 57, and output signal D3 and D5 from absolute-value circuit 5c and 5e are supplied to subtracter 54.

Output $\Delta 1$ of subtracter 51 indicates a smaller one of signals D1 and D2. Likewise, output $\Delta 2$ of subtracter 52 indicates a smaller one of signals D2 and D3, and output $\Delta 3$ of subtracter 53 indicates a smaller one of signals D2 and D3. Further, output $\Delta 4$ of subtracter 54 indicates a smaller one of signals D3 and D5, and output $\Delta 5$ of subtracter 55 indicates a smaller one of signals D4 and D5. Output $\Delta 6$ of subtracter 56 indicates a smaller one of signals D5 and D6, output $\Delta 7$ of subtracter 57 indicates a smaller one of signals D6 and D7. Outputs $\Delta 1$ to $\Delta 7$ of subtracters 51 to 57 are positive (+) or negative (−) polarity data.

Outputs $\Delta 1$ to $\Delta 7$ are supplied to hierarchical detection section 7a. Hierarchical detection section 7a derives detection outputs based on the truth table shown in FIG. 9. X marks in the truth table indicate indefinite portions. Hierarchical detection section 7a is constituted by a logic circuit.

As shown in the truth table, the detection signal is set to select signal C4 when $\Delta 3$ and $\Delta 5$ are positive, when $\Delta 3$ and $\Delta 4$ are positive and $\Delta 5$ is negative, or when $\Delta 3$ and $\Delta 4$ are negative and $\Delta 5$ is positive. Further, the detection signal is set to select signal C5 when $\Delta 4$, $\Delta 5$ and $\Delta 6$ are negative, and the detection signal is set to select signal C6 when $\Delta 4$, $\Delta 5$ and $\Delta 7$ are negative and $\Delta 6$ is positive. Also, the detection signal is set to select signal C6 when $\Delta 4$ and $\Delta 5$ are negative and $\Delta 6$ and $\Delta 7$ are positive, and the detection signal is set to select signal C3 when $\Delta 2$ and $\Delta 3$ are negative and $\Delta 4$ is positive. The detection signal is set to select signal C2 when $\Delta 1$, $\Delta 2$ and $\Delta 4$ are positive and $\Delta 3$ is negative, and detection signal is set to select signal C1 when $\Delta 1$ and $\Delta 3$ are negative and $\Delta 2$ and $\Delta 4$ are positive. As described above, according to this embodiment, correlation detection section 200 can be constituted by a plurality of subtracters and logic circuits in a simple hardware construction.

In the above embodiment, correlation detection section 200 is constructed by the hardware, but it is also possible to use a microcomputer in order to effect the same correlation detection process in a software manner.

Figure 10:
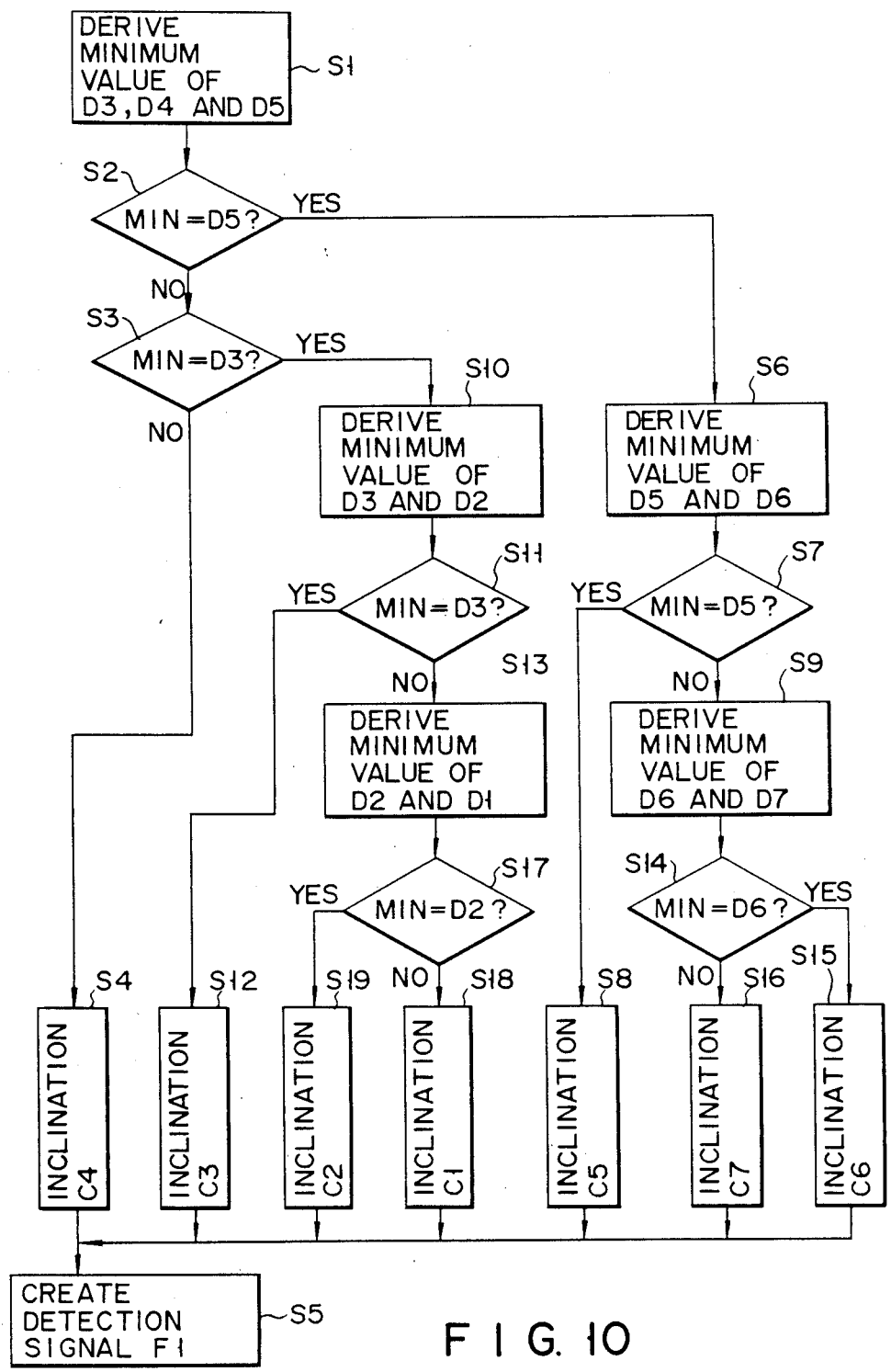
FIG. 10 is a flowchart showing another operation for illustrating the operation of correlation detecting section of this invention.

FIG. 10 shows an example of a flowchart used to effect the correlation detection process in a software manner.

In step S1, a calculation process is effected to detect the smallest one of correlation signals D3, D4 and D5 output from interpolation data and correlation data generation circuit 100. In step S2, it is checked whether signal D5 is the smallest signal or not. In this case, if it is detected that signal D5 is not the smallest signal, it is checked in step S3 whether signal D3 is the smallest signal or not. In this case, if it is detected that signal D3 is not the smallest signal step S4 is effected and the detection result that the inclination is C4 is derived. That is, the detection result that the interpolation signal to be selected is C4 is obtained. Based on the detection result, a signal for selecting signal C4 is obtained in step S5 for creating a detection signal.

The routine of steps S2 to S corresponds to the algorithm of block 70A

If the detection result that signal D5 is the smallest signal is obtained in step S2, step S6 is effected. In step S6, a calculation process is effected to detect a smaller one of signals D5 and D6. Next, it is checked in step S7 whether signal D5 is the smallest signal or not. In this case, if it is detected that signal D5 is not the smallest signal, step S9 is effected. In step S9, a calculation process is effected to detect a smaller one of signals D6 and D7. Next, it is checked in step S14 whether signal D6 is the smallest signal or not. In this case, if it is detected that signal D6 is the smallest signal, step S15 is effected and the detection result that the inclination is C6 is obtained, but if it is detected that signal D6 is not the smallest signal, step S16 is effected and the detection result that the inclination is C7 is obtained. In step S7, if it is detected that signal D5 is smallest signal, step S8 is effected and the detection result that the inclination is C5 is obtained.

The routine of steps S2, S6 to S9 and S14 to 15 corresponds to the algorithm of blocks 70C and 70E in FIG. 3.

If the detection result that signal D3 is the smallest signal is obtained in step S3, step S10 is effected. In step S10, a calculation process is effected to detect a smaller one of signals D2 and D3. Next, it is checked in step S11 whether signal D3 is the smallest signal or not. In this case, if it is detected that signal D3 is not the smallest signal, step S13 is effected. In step S13, a calculation process is effected to detect a smaller one of signals D1 and D2. Next, it is checked in step S14 whether signal D2 is the smallest signal or not. In this case, if it is the detected that signal D2 is smallest signal, step S19 is effected and the detection result that the inclination is C2 is obtained, but if it is detected that signal C2 is not smallest signal, step S18 is effected and the detection result that the inclination is C1 is obtained. In step s11, if it is detected that signal D3 is smallest signal, step S12 is effected and the detection result that the inclination is C3 is obtained.

The routine of steps S3, S10 to S13 and S17 to S19 corresponds to the algorithm of blocks 70B and 70D in FIG. 3.

Figure 11:
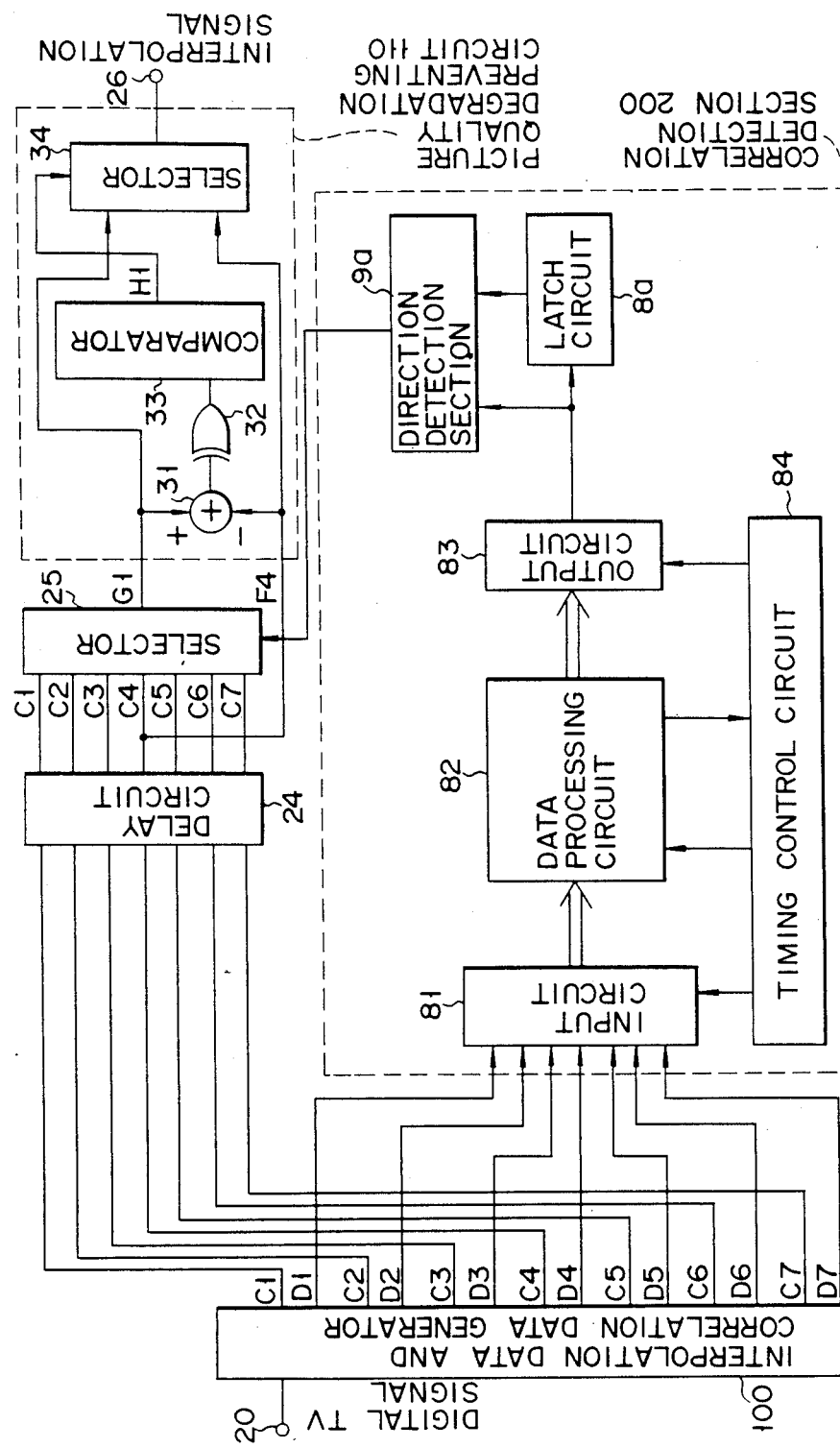
FIG. 11 is a circuit diagram showing another embodiment using a correlation detecting section having a correlation detection routine of FIG. 10.

FIG. 11 shows the construction of correlation detection section 200 using a microcomputer. Signals D1 to D7 output from interpolation data and correlation data generation circuit 100 are supplied to data processing circuit 82 via input circuit 81. Data processing circuit 82 performs the data processing based on the flowchart shown in FIG. 10. Final correlation detection result F1 obtained by data processing circuit 82 is output via output circuit 83. Timing control circuit 84 controls the operation timings of input circuit 81, data processing circuit 82 and output circuit 83. Other portions are the same as those of the embodiments shown in FIGS. 1, 6 and 8 and are denoted by the same reference numerals used in the embodiments.

As described above, according to this invention, an apparatus for detecting a pixel correlation and generating a interpolation signal for a digital television signal can be attained in which the advantage of the upper-lower signal addition type method can be maintained and the original high frequency component in a vertical direction can be prevented from being reduced and which can be formed in a simple hardware construction.

Further, in this invention, at least correlation data and interpolation data generation circuit 100 is formed on a printed circuit board. Tapped delay lines 21 and 23 are arranged in parallel, but the signal input and output sections are arranged in a direction opposite to each other. The reason why tapped delay lines 21 and 23 are arranged as described above is to suppress the number of intersect portions between the wiring lines of adders 3a to 3g and the wiring lines of subtracters 4a to 4g to a minimum. For example, when the wiring structure as indicated by the arrows in FIG. 2 is selected, a large number of wirings intersect one another, making it difficult to form a wiring board. Thus, the wiring of interpolation data and correlation data generation circuit 100 used in this invention can be made simple and can be easily manufactured.

According to the above embodiments, the correlation detection device generates a correlation detection signal for selecting an interpolation signal. However, the operation wherein the correlation between pixels is detected may be effected in other various cases.

For example, the operation may be effected in a case where it is detected whether input video data is an animation image or still image. In this case, a movement detection circuit is used, but the direction of inclination can be detected by using the correlation detection device of this invention so that the direction of movement of the animation image can be detected. In this case, a frame memory or field memory is used, and a correlation signal using a pixel between the frames or fields is generated in correlation data generation circuit 100.

Figure 12:
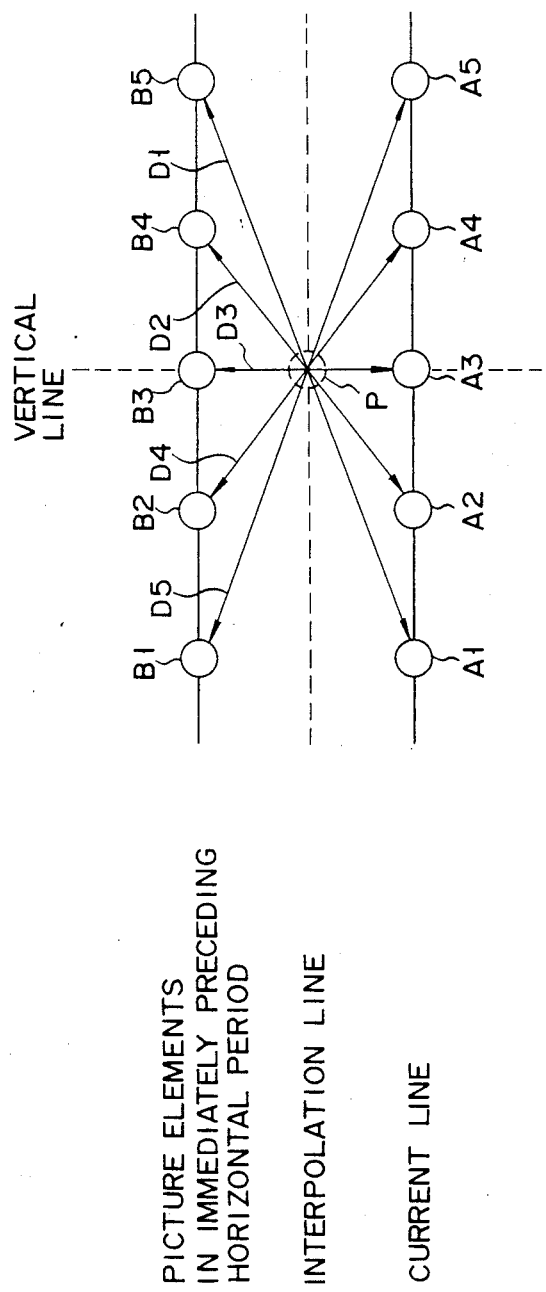
FIG. 12 is a diagram showing a pixel processing principle for illustration of the operation of another embodiment of this invention.

In the above embodiments, a correlation signal is formed by using a pixel in the original line and a pixel generated in an immediately preceding horizontal period. However, this invention is not limited to the above embodiments. For example, it is possible to set the period of a pixel for obtaining a correlation signal equal to a period corresponding to several horizontal lines. In a case where there are many picture images which change at a rapid rate, a precise correlation signal can be created by increasing the period of the pixel. For example, it is effective to increase the period of the pixel when interpolation signals are created between horizontal lines by using video signals which have been obtained by shooting an outside scene from a car running at a high speed. Further, in the above embodiments, correlation and interpolation signals are created by using 14 pixels in total. However, the number of pixels used in this case can be more increased or decreased. FIG. 12 shows another embodiment. In this embodiment correlation and interpolation signals are created by using 10 pixels in total. In this case, the algorithm for a correlation detecting section is shown by FIG. 13.

What is claimed is:

1. An apparatus for detecting a pixel correlation for a digital television signal comprising:
    correlation data generation means having four regions imaged, which regions are the upper right region, the upper left region, the lower right region, and the lower left region, and are divided by a vertical line and a horizontal line which cross at the position of a pixel to be interpolated, said correlation data generation means having means for generating a vertical direction correlation signal generated by deriving a difference between two pixels which are present on the vertical line and which respectively lie on upper and lower sides of the position of the pixel to be interpolated, a plurality of left-downward angle correlation signals created for respective pairs of pixels lying symmetrically in the upper right and lower left regions, respectively, and a plurality of right-downward angle correlation signals created for respective pairs of pixels lying symmetrically in the upper left and lower right regions, respectively, and correlation detecting means including algorithm means for detecting the smallest one of the absolute values of the vertical correlation signal, a first left-downward angle correlation signal, and a first right-downward angle correlation signal, which signals are derived from said plurality of left-downward angle correlation signals and said plurality of right-downward angle correlation signals, by using pixels which are closest to the vertical line, detecting the smallest one of the absolute values of said vertical correlation signal and outputting data indicating the pixels which are used to obtain the smallest value as the correlation detection signal when the vertical correlation signal is detected to have the smallest value, detecting the smallest one of said plurality of left-downward angle correlation signals and outputting data indicating the direction and angle of pixels which are used to obtain the smallest value as the correlation detection signal when the first left-downward angle correlation signal is detected to have the smallest value, and detecting the smallest one of said plurality of right-downward angle correlation signals and outputting data indicating the direction and angle of pixels which are used to obtain the smallest value as the correlation detection signal when the first right-downward angle correlation signal is detected to have the smallest value.

2. An apparatus for detecting a pixel correlation for a digital television signal according to claim 1, wherein said correlation data generation means includes means for generating the plurality of signals including three left-downward angle correlation signals and three right-downward angle correlation signals; and said correlation detecting means includes:

first algorithm means, for detecting the smallest one of the absolute values of the vertical correlation signal, a first left-downward angle correlation signal and a first right-downward angle correlation signal which are derived from said three left-downward angle correlation signals and three right-downward angle correlation signals by using pixels which are closest to the vertical line, second algorithm means, for detecting a smaller one of the absolute values of two left-downward angle correlation signals;

third algorithm means, for detecting a smaller one of the absolute values of two right-downward angle correlation signals;

fourth algorithm means, for detecting a smaller one of the absolute values of two left-downward angle correlation signals;

fifth algorithm means, for detecting a smaller one of the absolute values of two left-downward angle correlation signals;

hierarchical detection means for receiving the detection results from said first to fifth algorithm means, and outputting data indicating the direction (vertical direction) of pixels used for deriving the vertical correlation signal as the correlation detection signal when the vertical correlation signal is detected to have the smallest absolute value; outputting data indicating the direction and angle of pixels used for deriving a value corresponding to the detection result obtained from said second algorithm means as the correlation detection signal when the first left-downward angle correlation signal is detected to have the smallest absolute value; outputting data indicating the direction and angle of pixels used for deriving a value corresponding to the detection result obtained form said third algorithm means as the correlation detection signal when the first right-downward angle correlation signal is detected to have the smallest absolute value; outputting data indicating the direction and angle of pixels used for deriving a value corresponding to the detection result obtained from said fourth algorithm means as the correlation detection signal when the second left-downward angle correlation signal is detected to have the smallest absolute value; outputting data indicating the direction and angle of pixels used for deriving a value corresponding to the detection result obtained from said fourth algorithm means as the correlation detection signal when the third left-downward angle correlation signal is detected to have the smallest absolute value; outputting data indicating the direction and angle of pixels used for deriving a value corresponding to the detection result obtained from said fifth algorithm means as the correlation detection signal when the second right-downward angle correlation signal is detected to have the smallest absolute value; outputting data indicating the direction and angle of pixels used for deriving a value corresponding to the detection result obtained from said fifth algorithm means as the correlation detection signal when the third right-downward angle correlation signal is detected to have the smallest absolute value; outputting data to preferentially effect said second algorithm means when the first left-downward angle correlation signal is the smallest absolute value corresponding to said first algorithm means; outputting data to preferentially effect said third algorithm means when the first right-downward angle correlation signal is the smallest absolute value corresponding to said first algorithm means; outputting data to preferentially effect said fourth algorithm means when the second left-downward angle correlation signal is the smallest absolute value corresponding to said second algorithm means; outputting data to preferentially effect said fifth algorithm means when the second right-downward angle correlation signal is the smallest absolute value corresponding to said third algorithm means.

3. An apparatus for detecting a pixel correlation for digital television signal according to claim 1, wherein said correlation data generation means includes means for generating the plurality of signals including first, second, and third left-downward angle correlation signals and first, second, and third right-downward angle correlation signals, the firs left-downward angle correlation signal being obtained from pixels closest to the vertical line, the second left-downward angle correlation signal being obtained from pixels farther from the vertical line than those of the first left-downward angle correlation signal, the third left-downward angle correlation signal being obtained from pixels farther from the vertical line than those of the second left-downward angle correlation signal, the first right-downward angle correlation signal being obtained from pixels closest to the vertical line, the second right-downward angle correlation signal being obtained from pixels farther from the vertical line than those of the first right-downward angle correlation signal, the third right-downward angle correlation signal being obtained from pixels farther from the vertical line than those of the second right-downward angle correlation signal;

said correlation detecting means includes;
a first subtracter, for deriving a first polarity signal by subtracting the second left-downward angle correlation signal from the third left-downward angle correlation signal;
a second subtracter, for deriving a second polarity signal by subtracting the second left-downward angle correlation signal from the first left-downward angle correlation signal;
a third subtracter, for deriving a third polarity signal by subtracting the vertical correlation signal from the first left-downward angle correlation signal;
a fourth subtracter, for deriving a fourth polarity signal by subtracting the first left-downward angle correlation signal from the first right-downward angle correlation signal;
a fifth subtracter, for deriving a fifth polarity signal by subtracting the vertical correlation signal from the first right-downward angle correlation signal;
a sixth subtracter, for deriving a sixth polarity signal by subtracting the second right-downward angle correlation signal from the first right-downward angle correlation signal;
a seventh subtracter, for deriving a seventh polarity signal by subtracting the second right-downward angle correlation signal from the third right-downward angle signal; and
logic means for receiving the first to seventh polarity signals and outputting a correlation detection signal corresponding to pixels used for deriving the vertical correlation signal when the third and fifth polarity signals are positive, when the third and fourth polarity signals are positive and the fifth polarity signal is negative, or when the third and fourth polarity signals are negative and fifth polarity signal is positive; outputting a correlation detection signal corresponding to pixels used for deriving the first right-downward angle correlation signal when the fourth, fifth, and sixth polarity signals are negative; outputting a correlation detection signal corresponding to pixels used for deriving the second right-downward angle correlation signal when the fourth, fifth, and seventh polarity signals are negative and the sixth polarity signal is positive; outputting a correlation detection signal corresponding to pixels used for deriving the third right-downward angle correlation signal when the fourth and fifth polarity signals are negative and sixth and seventh polarity signals are positive; outputting a correlation detection signal corresponding to pixels used for deriving the first left-downward angle correlation signal when the second and third polarity signals are negative and fourth polarity signal is positive; outputting a correlation detection signal corresponding to pixels used for deriving the second left-downward angle correlation signal when the second and fourth polarity signals are negative and the third polarity signal is positive; outputting a correlation detection signal corresponding to pixels used for deriving the third left-downward angle correlation signal when the first and third polarity signals are negative and second and fourth polarity signals are positive.

4. An apparatus for detecting a pixel correlation for a digital television signal according to claim 1, wherein said correlation detection means includes latch means and direction detection means provided in the output section thereof, and said latch means holds an output correlation detection signal until the next correlation detection signal is derived and said direction detection means forcedly outputs a final correlation detection signal indicating that the correlation pixel is in the vertical direction when the inclined direction detected by the next correlation detection signal is different from that of the correlation detection signal held in said latch means.

5. An apparatus for generating an interpolation signal for a digital television signal according to claim 1, comprising:
said correlation data generation means including means for deriving a standard interpolation signal obtained by adding together pixels in the vertical direction, a left-downwardly inclined direction interpolation signal obtained by adding pixels in the left-downwardly inclined direction, and a right-downwardly inclined direction interpolation signal obtained by adding pixels in the right-downwardly inclined direction; and
selecting means connected to said correlation data generation means, for receiving the standard interpolation signal, left-downwardly inclined direction interpolation signals and right-downwardly inclined direction interpolation signals as selected signals, and the correlation detection signal output from said correlation detection means as a control signal, and selecting and outputting interpolation data generated by the same pixels as those used for generating the correlation signal having the smallest absolute value in said correlation detection means.

6. An apparatus for generating an interpolation signal for digital television signal according to claim 5, wherein said selecting means is connected to picture quality degradation preventing means receiving the standard interpolation signal and an output interpolation signal of said selecting means,
said picture quality degradation preventing means includes:
a subtracter for deriving a difference signal between the output interpolation signal and standard interpolation signal;
a comparator for comparing the absolute value of an output of said subtracter with a reference value;
a selector for receiving the output interpolation signal and standard interpolation signal, and outputting the standard interpolation signal as a final output interpolation signal when an output of said comparator indicates that the absolute value of the difference signal is larger than the reference value, and outputting the output interpolation signal as a final output interpolation signal when the output of said comparator indicate that the absolute value of the difference signal is smaller than the reference value.

* * * * *